June 2, 1953  E. M. BOWEN  2,640,254
AUTOMATIC TRANSFER MACHINE TOOL
Filed Feb. 24, 1948  14 Sheets-Sheet 3

Fig. 3

INVENTOR
Earl M. Bowen
By Carlson, Pitzner, Hubbard & Wolfe
ATTORNEYS

June 2, 1953 — E. M. BOWEN — 2,640,254
AUTOMATIC TRANSFER MACHINE TOOL
Filed Feb. 24, 1948 — 14 Sheets-Sheet 8

INVENTOR
Earl M. Bowen
By Carlson, Pitzner, Hubbard & Wolfe
ATTORNEY

June 2, 1953  E. M. BOWEN  2,640,254
AUTOMATIC TRANSFER MACHINE TOOL
Filed Feb. 24, 1948  14 Sheets-Sheet 9

INVENTOR
Earl M. Bowen
ATTORNEYS

Patented June 2, 1953

2,640,254

UNITED STATES PATENT OFFICE 2,640,254

AUTOMATIC TRANSFER MACHINE TOOL

Earl M. Bowen, Rockford, Ill., assignor to The Ingersoll Milling Machine Company, Rockford, Ill., a corporation of Illinois Application February 24, 1948, Serial No. 10,523

5 Claims. (Cl. 29—33)

This invention relates to machine tool organizations of the type in which workpieces are transferred step by step through one or more stations at which the workpieces are located accurately, clamped, machined or otherwise operated upon, and finally released for continued advance.

One object of the invention is to provide a transfer machine tool of the above character adapted to handle workpieces which are too small or so shaped as to preclude the use of the usual dowel locaters.

A more detailed object is to provide such a machine tool organization in which the workpieces are located preparatory to final machining by separate positioning motions in two transverse directions and then finally positioned in a third dimension.

A further object is an automatic transfer type of machine tool which is especially adapted for operating on elongated workpieces preferably simultaneously on opposite ends thereof.

Still another object is to adapt the machine tool in a novel manner for use with workpieces of varying lengths.

A further object is to provide in an organization of the above character a novel mechanism for detecting the failure of one of the machining stations to operate properly and either indicating such defect or automatically disabling the machine tool or part thereof so as to prevent subsequent damage.

The invention also resides in the novel and simple construction of the various mechanisms for locating and clamping the workpieces and inspecting the same.

Other objects and advantages of the invention will become apparent from the following detailed description taken in connection with the accompanying drawings, in which.

Figure 15:
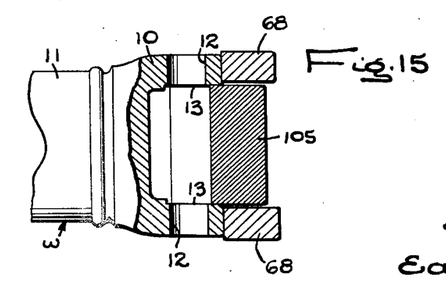
Fig. 15 is a fragmentary view of one end of the workpiece with part thereof shown in section.
Figures 22, 23:
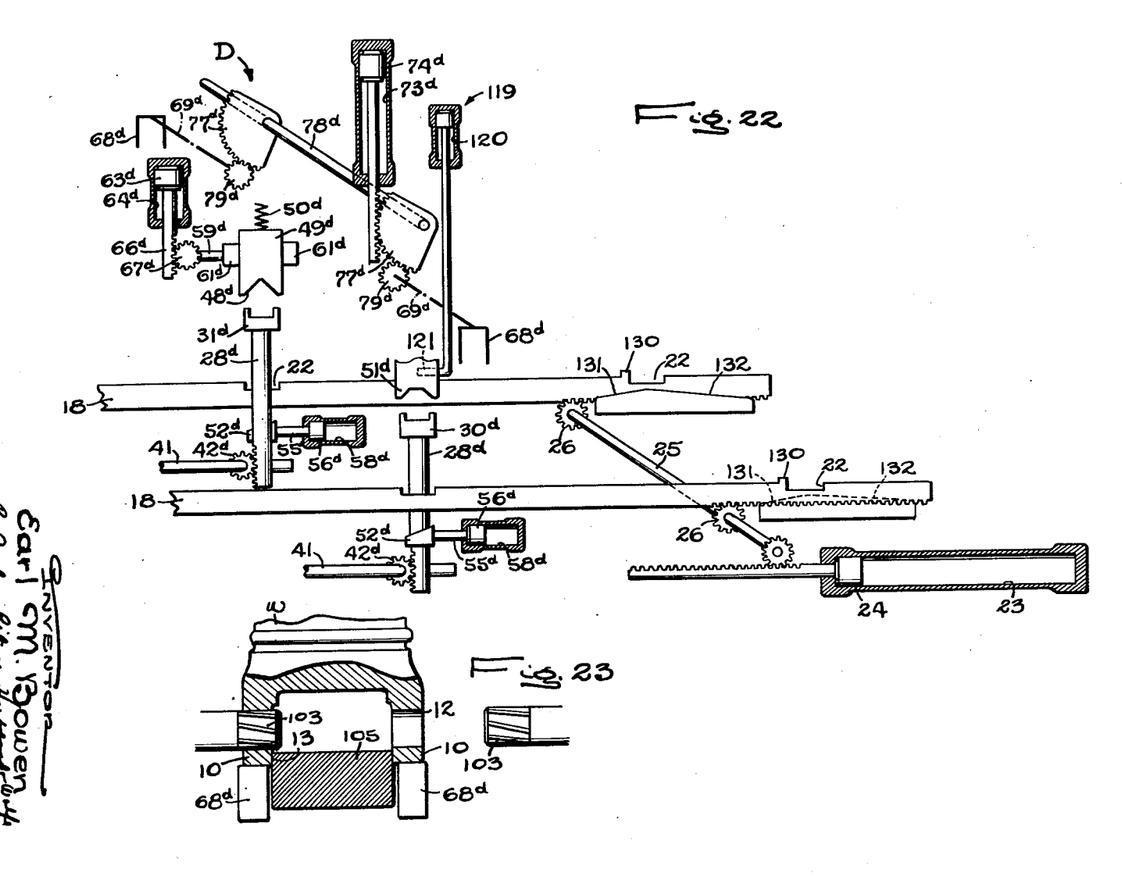

For purposes of illustration, the invention has been shown in the drawings incorporated in a machine tool organization for performing drilling, milling, and boring operations on forked portions or yokes 10 (Fig. 4) at opposite ends of a tube 11, the workpiece as a whole being designated "w." Alined holes 12 are drilled and finish bored in the parallel arms of each yoke 10, and the interior of the yoke is milled to form parallel surfaces 13 (Figs. 15 and 23). It is to be understood, however, that the invention is not limited to this kind of workpiece or to the particular character of the metal removing operations performed thereon, but is intended to cover all modifications and alternative constructions and arrangements falling within the spirit and scope of the appended claims.

Figures 18, 19, 20, 21:
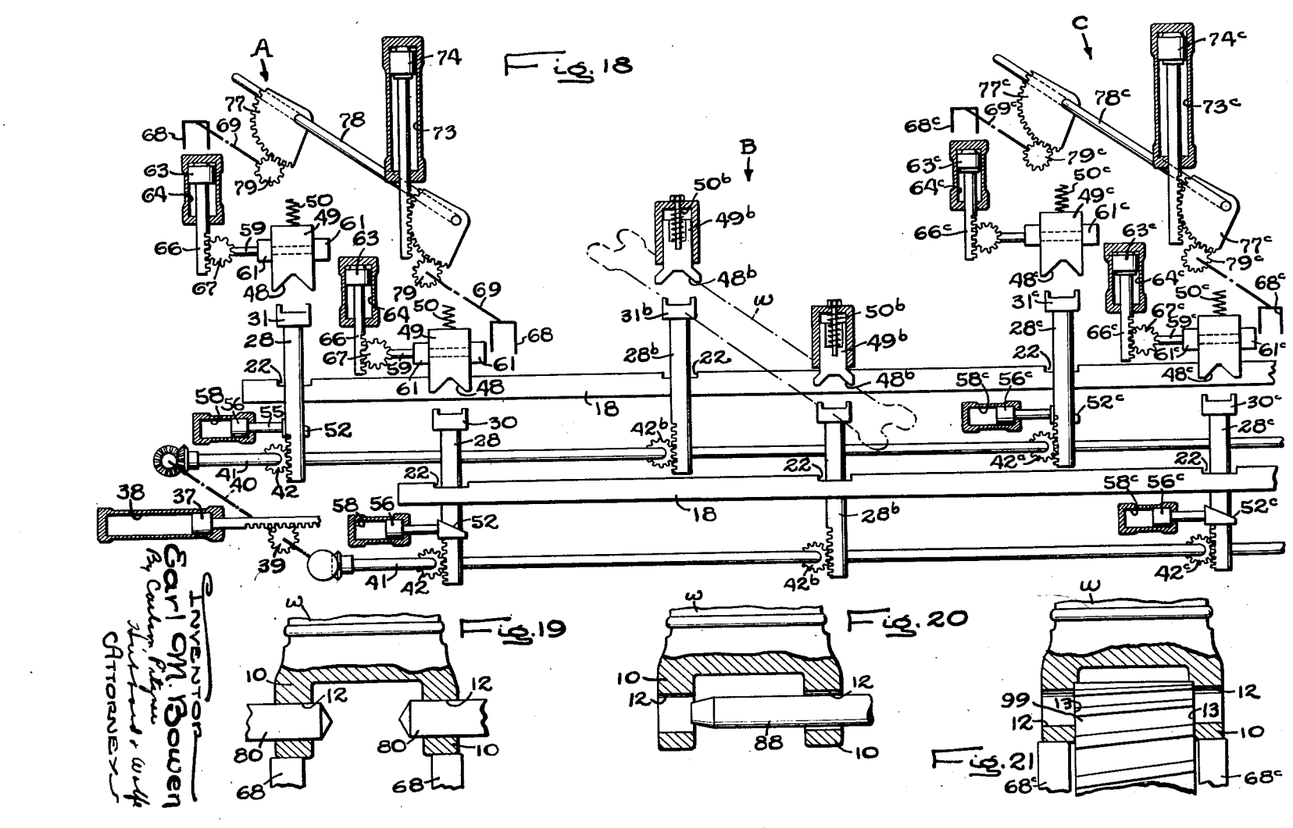
Figs. 18 and 22 when arranged end to end form a schematic layout of the main movable parts of the machine tool organization.
Figs. 19, 20, 21 and 23 are detail views of the tooling at the different stations of the machine organization.

In the exemplary machine tool organization shown, workpieces are loaded successively onto a shiftable transfer member at one end of the line-up of machines, are moved into a station A (Figs. 3 and 18) in which the holes 12 are drilled, are transferred to and inspected in a station B (Figs. 12, 13, and 18), are transferred to successive milling and finish boring stations C and D (Figs. 14 and 22), and are finally moved into an unloading station (Figs. 16 and 17) at the other end of the machine line. Throughout their progress through the successive stations, the workpieces are disposed in horizontal position and maintained in uniformly spaced parallel relation, being advanced sidewise into each station. In each machine station, the workpiece is disconnected from the transfer member by moving the two relative to each other laterally of the path in which the workpiece is transferred. Then, the workpiece is first shifted to position the same in one direction and then shifted in a transverse direction. Finally, the piece is shifted in a third direction to a final operating position and thus accurately located in three dimensions in relation to the tool for machining the piece. After clamping in this final position, the machining operation is performed followed by release of the workpiece and reconnection with the transfer mechanism for advance to the next station.

Figure 1:
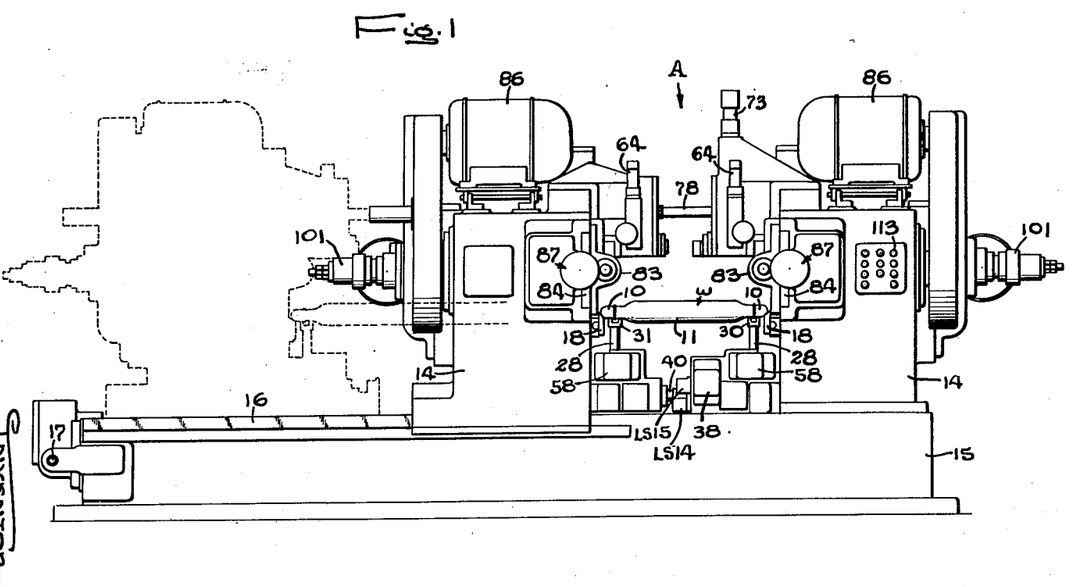
Figure 1 is an end elevational view of a machine tool organization embodying the present invention, one of the parts being shown in phantom in a changed position.

At each station, the locating, holding, and machining mechanisms and their power actuators are supported on spaced upright columns 14 (Fig. 1) mounted on a bed 15 and disposed on opposite sides of the path along which the workpieces are advanced. To accommodate workpieces of different lengths, one of the columns 14 is fixed to one end of the bed 15, while the other column is adjustable along ways 16 between the position shown in full and in phantom in Fig. 1. Such adjustment may be effected through a screw and nut mechanism (not shown) adapted to be actuated by turning a hand crank on a shaft 17 (Fig. 1).

In the present instance, the mechanism for transferring the workpieces from station to station comprises two laterally spaced bars 18 (Figs. 3, 4, 6, 18, and 22) which extend through all of the stations across the several beds 15 and are slidable endwise in guides formed on the columns 14 so that the spacing of the bars may be adjusted along with the other parts to correspond to the length of the workpieces being operated on. As shown in Fig. 4, the bar guides are formed by blocks 19 set in the columns 14 at the drilling and unloading stations and providing guide surfaces which mate with rods 20 secured to the outer sides of the bars. Clamps 21 overlie the upper edge portions of the transfer bars.

On their inner sides, the transfer bars 18 are formed with elements adapted to interfit with the end portions of the workpieces and maintain the desired spacing of the pieces along the bars. Herein, these elements are the walls of recesses 22 spaced along the bars to correspond to the spacing of the work stations, and each is adapted to receive the extreme ends of the workpiece yokes 10 as shown in phantom in Fig. 4. Thus, the recesses are slightly longer than the width of the yokes 10 and are formed with an inwardly and downwardly inclined bottom 22$^a$ which tends to shift the received workpiece into an approximately centered position.

Figures 16, 17:
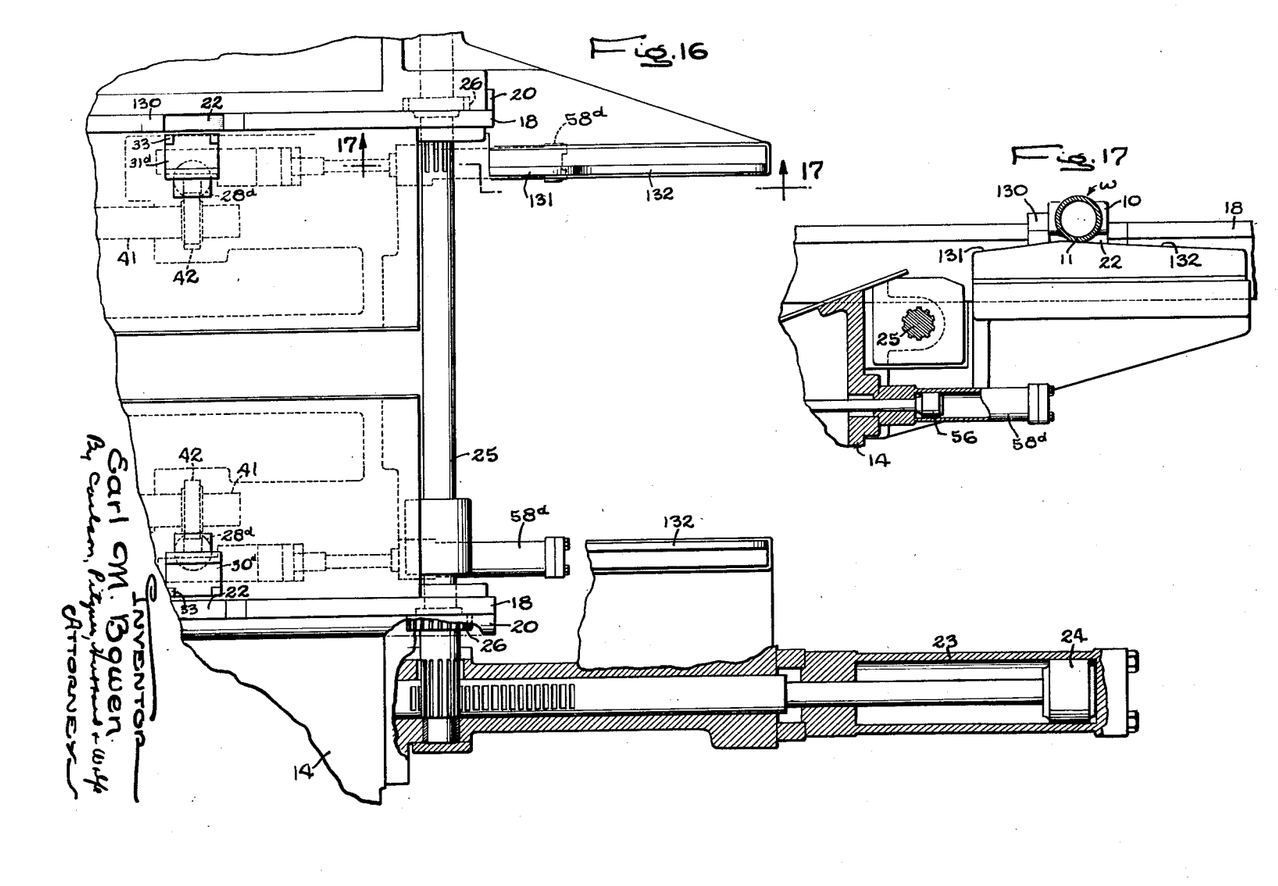
Fig. 16 is a fragmentary plan view of part of the unloading end of the machine tool organization.
Fig. 17 is a fragmentary sectional view taken along the line 17—17 of Fig. 16.

In the present instance, the transfer bars 18 are reciprocated back and forth by a hydraulic actuator located at the unloading end of the line of machines. As shown in Figs. 16 and 22, this actuator comprises a stationary cylinder 23 and a piston 24 therein whose rod is a rack meshing with a gear on a cross shaft 25 carrying gears 26 which in turn mesh with the rack teeth on the undersides of the rods 20 secured to the transfer bars. One of the gears 26 is splined on the shaft 25.

The strokes of the transfer bars 18 as determined by the length of the cylinder 23 are equal to the longitudinal spacing of the work stations from each other so that as the bars advance, the workpieces supported in the recesses 22 thereon will be moved to the next station and there positioned for proper operation of the other mechanisms thereon. In the return or idle stroke of the transfer bar, each pair of recesses 22 will be returned to the preceding station in the line preparatory to receiving the workpieces then being operated on in these stations. In this retracted position, the bars 18 will project outwardly from the first or drilling station A, and the first pair of recesses 22 will be exposed and adapted to receive the next workpiece as the operator slides this piece sidewise into loading position along the top of the bars.

After being advanced into the machining stations A, C, and D, the workpieces are disconnected from the transfer mechanism which, in this instance, is effected by lifting the pieces vertically off from the transfer bars to a position short of their final working location. For this purpose, elevator rods 28 (Figs. 3, 4, 9, and 18) are slidable in vertical guides 29 in the columns 14 and carry at their upper ends jaws 30 and 31 (Figs. 4 and 9) which engage the undersides of the work yokes 10 inwardly from the points of engagement of the latter by the transfer bar surfaces 22$^a$. The jaw 30 is swiveled on a pin 32 which permits rocking of the jaw longitudinally of the workpiece to permit full engagement of the flat end of a projection 33 with both arms of the yoke 10 and also engagement of a projection 34 with the adjacent tubular portion of the workpiece (see Figs. 4 and 9).

The other jaw 31 is swiveled on pins 35 (Fig. 5) journaled in flared seats 36 so as to allow for some degree of rocking of the jaw in the plane of the swiveling axis. This allows the jaw to come into full engagement with both arms of the work yoke 10 in spite of small variations in the angular position of one of the yokes relative to the other.

The elevator rods 28 are raised and lowered by a power actuator herein comprising a piston 37 (Figs. 6 and 18) in a cylinder 38. The piston rod (see Fig. 3) is a rack meshing with the gear 39 on a cross shaft 40 bevel geared to shafts 41 which extend through the stations A, B, C, and D. The shafts 41 carry pinions 42 which mesh with rack bars 43 having limited lost motion connections 44 (Fig. 4) with the rods 28 and urged upwardly relative to the rods by springs 45 (Fig. 10) seated in the racks 43 and acting on an abutment 46 on the rod 28.

In the lowered positions of the elevators 28 determined by engagement of the piston 37 with the head end of the cylinder 38, the jaws 30 and 31 are disposed below the path of sidewise advance of the workpieces as indicated by the workpiece shown in phantom in Fig. 4. As the rods 28 are elevated, the workpiece at each station is lifted off the transfer bars 18 and eventually elevated into engagement with downwardly facing forked or V-shaped seats 48 (Fig. 3) in blocks 49 which serve to position both ends of the workpiece sidewise and therefore horizontally in one transverse direction. The blocks 49 are guided on the column 14 for vertical movement in the plane of the lower jaw lugs 34 so as to engage the top of the tubular part 11 of the workpiece. The blocks 49 are urged downwardly by springs 50 (Figs. 4 and 9) so that the preliminary positioning and temporary holding of the workpiece short of its final working position is of a yieldable character. The extent of the preliminary elevating of the workpieces is determined by engagement of the piston 37 with the rod end of the cylinder 38, and, in the case of each of the stations A, B, C, and D, is such as to carry the workpiece slightly beyond the point of initial engagement with the V-shaped seats 48 in the yieldable blocks 49.

Figures 9, 10:
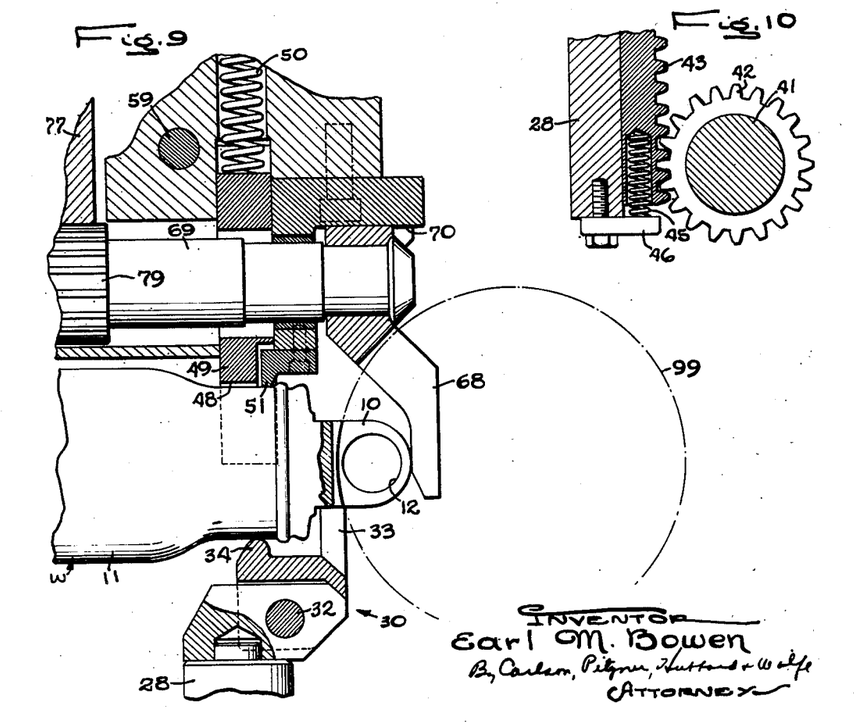
Fig. 9 is a fragmentary section taken along the line 9—9 of Fig. 8.

Accurate and final vertical positioning of the workpiece in the drilling, milling and boring stations A, C, and D is effected by forcing the lower jaws 30 and 31 upwardly by positive action to overcome the springs 50 and raise both ends of the workpiece into engagement with horizontal downwardly facing abutments 51 as shown in Figs. 4 and 9. These abutments are rigid with the columns 14 at points adjacent the yieldable blocks 49 so as to be engageable with the tubular parts 11 of the workpiece. Such positive clamping action is produced in the present instance by projecting wedges 52 (Figs. 3, 4, and 18) transversely of the elevator rods 28 through slots 53 in the sides thereof. The wedges thus act on follower abutments 54 (Fig. 4) to move the rods 28 upwardly and independently of their main actuator as permitted by the lost motion connections 44. The wedges 52 are carried on the ends of rods 55 (see Fig. 6) of pistons 56 reciprocable in cylinders 58 fixed on the column 14.

The V-blocks 49 are utilized to hold the workpiece positively against sidewise shifting during the machining operations. To this end, a shaft 59 (Figs. 7 and 8) extends across the upper end portion of each block and is journaled in the column 14 supporting the latter so as to turn about an axis paralleling the surfaces of the V-shaped seat 48. Right and left-hand screw threads 60 formed on the shaft mate with nuts 61 disposed on opposite sides of the block and acting, when tightened against the block, to prevent raising of the latter in its guides. With the block thus clamped positively while engaging the tubular part of the workpiece, any lateral shifting of the workpiece along the flat ends of the jaws 31 or the abutments 51 is prevented. The shaft 59 is turned in opposite directions to clamp and release the blocks 49 by an actuator comprising a piston 63 movable in a vertical hydraulic cylinder 64 (Fig. 7) stationarily mounted on the associated column 14. The piston has a lost motion connection 65 with a rack bar 66 which meshes with a pinion 67 on the shaft 59.

When a workpiece is thus clamped, its ends are accurately located vertically in positions determined by the abutments 51. Both forks 10 thereof are similarly positioned angularly by virtue of engagement of their arms with the lugs 33 of the lower jaws 30 and 31.

Positioning of the workpiece in an endwise direction or transversely of the direction of positioning by the V-blocks 49 is effected before final or positive vertical clamping as above described against the abutments 51. Such positioning is accomplished in this instance by bifurcated arms 68 (Figs. 4, 7, and 9) which are disposed outwardly beyond the ends of the work yokes 10 and are engageable with the ends of the yoke arms when the workpiece is positioned against the preliminary locating stops 48. The arms 68 are loose on and hang downwardly from horizontal shafts 69 which are journaled in overhanging parts of the columns 14 for endwise movement during which the flat upper ends of the arms slide along guide surfaces 70 (Fig. 4) which hold the arms against turning on the shafts.

Movement of the arms 68 toward each other to center the workpiece in relation to the tools for operating thereon is effected in this instance by screw mechanisms comprising threads 71 (Fig. 4) formed on the inner ends of the shafts 69 and threading into nuts 72 fixed in the columns 14. The leads of the screws are such that the arms 68 move toward each other at the same rate when the shafts are turned in one direction. One arm engages its work end before the other, and shifts the workpiece endwise until the pressures on both ends of the piece are equalized. Since both of the arms 68 are positioned accurately at all times in relation to the associated tools, the workpiece as a whole will be centered longitudinally thus locating each end of the piece horizontally in the same relation with respect to its associated cutting tool later to be described. Upon reverse turning of the shaft, the arms 68 will be separated and thus backed away from the ends of the workpiece.

Turning of the shafts 69 is effected in the present instance by a power actuator comprising a hydraulic cylinder 73 (Figs. 4, 7 and 18) whose piston 74 has a short lost motion connection 75 (Fig. 4) with a rack bar 76 meshing with one of two gear segments 77. One of the latter is fixed and the other splined on a cross-shaft 78, and the segments in turn mesh with pinions 79 on the two screw shafts 69.

Figure 2:
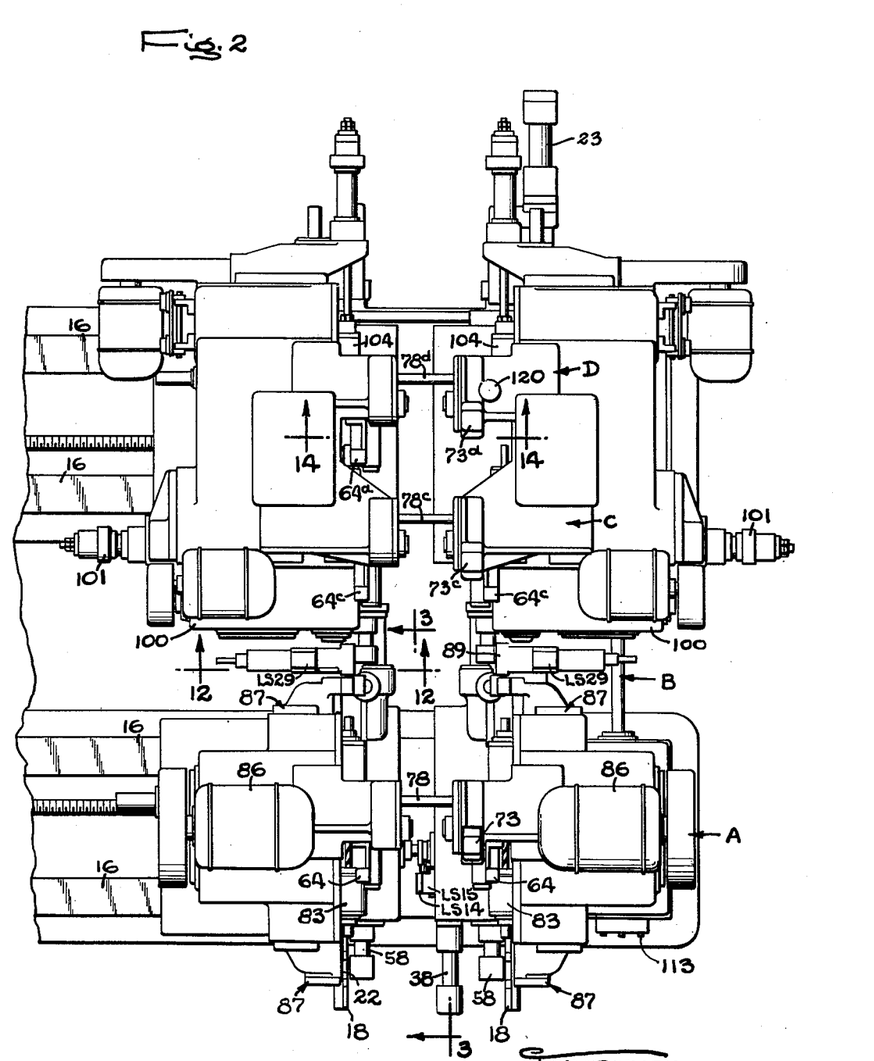
Fig. 2 is a fragmentary plan view.

At the drilling station A, the holes 12 in the opposite yokes of the workpiece are formed by drills 80 (Fig. 3) guided in bushings 81 which are positioned accurately on the columns 14 to locate their axes properly in relation to the ends of the work yokes 10 and the axis of the workpiece after final positioning and clamping thereof as described above. The drills are carried by spindles 82 journaled in boxes 83 (Fig. 3) which are rigid with slides 84 movable in guides 85 (Figs. 3 and 4) formed in the faces of the columns 14. Within the boxes 83 the spindles carry gears (not shown) which have spline connections with gears mounted on the columns and driven by motors 86 (Figs. 1 and 2) to turn the drills at the desired speeds. The slides 84 are moved toward and away from each other by individual hydraulic actuators 87 mounted on the columns and having pistons connected to the respective slides 84.

Except for minor differences at the inspecting and boring stations B and D, the elevating, positioning, locating, and clamping mechanisms above described are duplicated at each of the stations A, B, C, and D, and the corresponding parts are indicated by the same reference numbers with the addition of the letters of the respective stations.

Figures 7, 11:
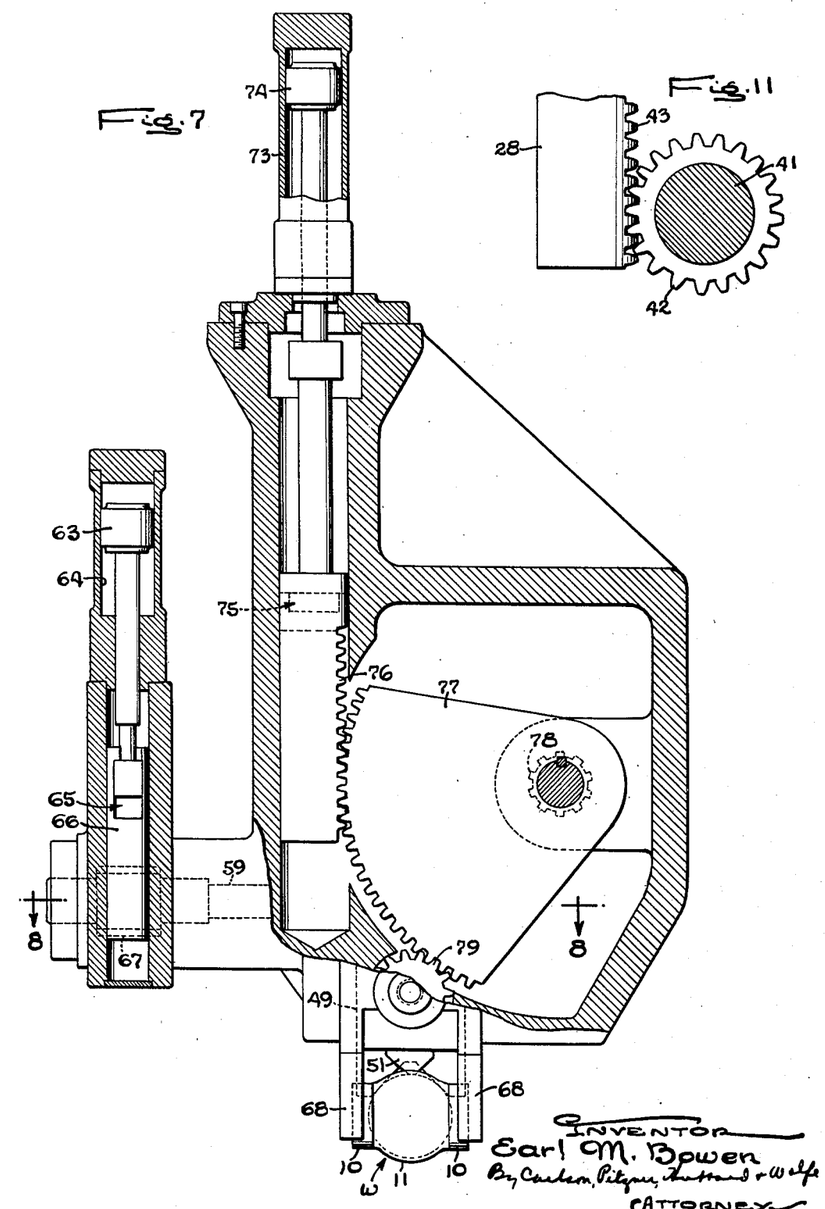
Figs. 10 and 11 are detail sections taken respectively along the lines 10—10 and 11—11 of Fig. 6.
Figure 8:
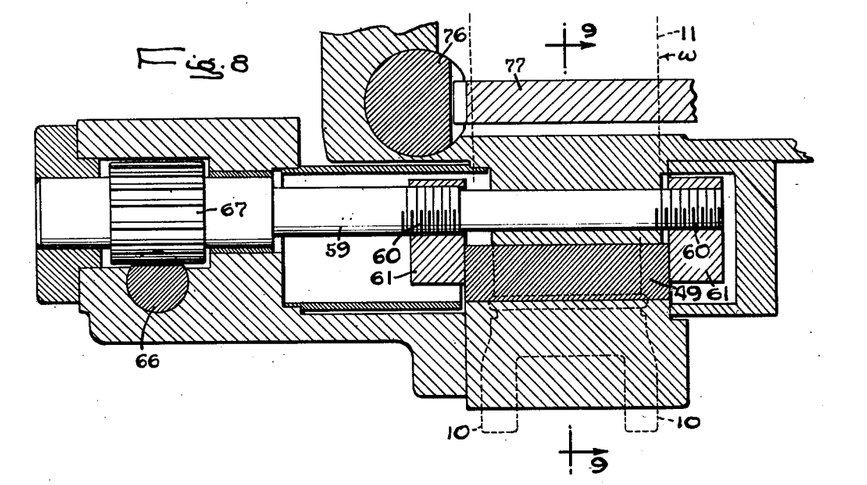
Fig. 8 is a fragmentary section taken along the line 8—8 of Fig. 7.

At the inspecting station, final positioning of the workpiece both vertically and sidewise is effected by the V-blocks 49$^b$ (Fig. 12), the secondary stops 51, the clamps for the V-blocks, and the wedges for further elevating the rods 28 being omitted. For the same reason, the rack bars 43 are made rigid with the rods 28 as shown in Fig. 11 so that the upward movement of the workpieces is determined by the limit position of the actuating piston 37, the workpieces having been brought into engagement with the yieldable blocks 49$^b$ at this time.

Provision is made at the station B to inspect the parts of the workpiece machined at the first station A for the purpose of determining in this instance whether the holes 12 have been drilled properly through the yokes 10, or of detecting the presence of a broken drill or other obstruction which might render the partially machined work defective and result in damage if the piece were permitted to advance into the next station or if the previous station were permitted to operate on the next workpiece. While such inspection may be effected in various ways, it is accomplished herein by a mechanical feeler in the form of a pin 88 (Figs. 12, 13, and 18) slidable in a guide 89 on the columns 14 and substantially alined with the holes 12 in one end of the workpiece after the latter has been elevated into engagement with the V-block 49ᵇ. A similar feeler is provided for examining the hobs 12 at the other end of the workpiece.

Figure 12:
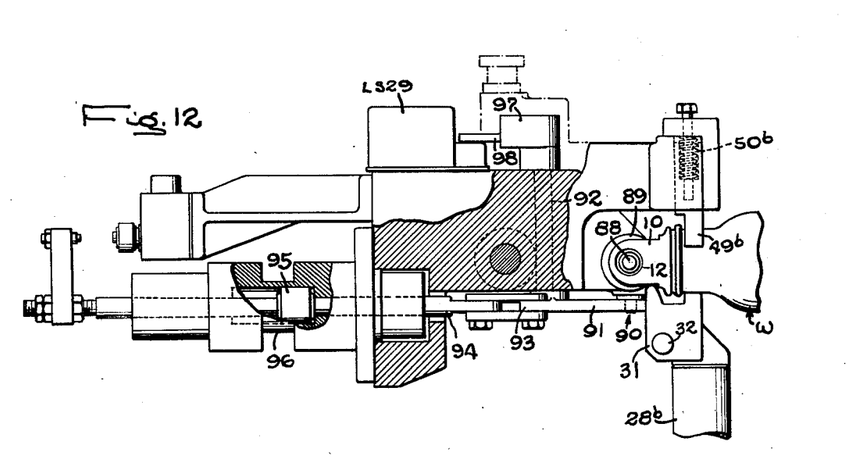
Fig. 12 is a fragmentary section taken along the line 12—12 of Fig. 2.
Figure 13:
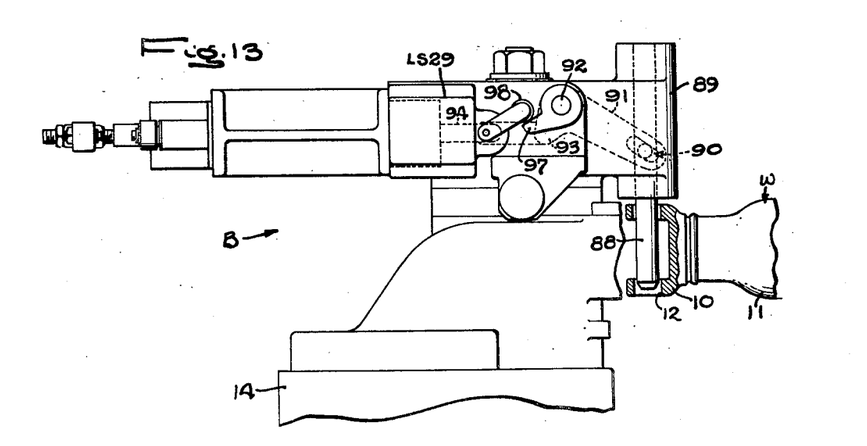
Fig. 13 is a plan view of the mechanism shown in Fig. 12.
Figure 14:
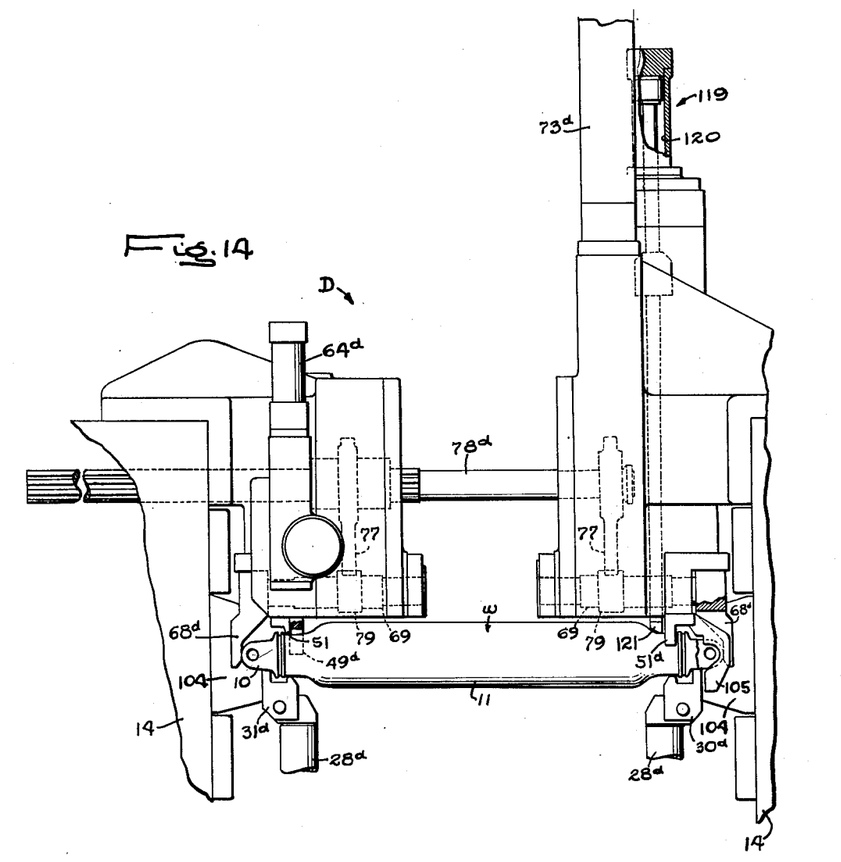
Fig. 14 is a fragmentary section taken along the line 14—14 of Fig. 2.

Intermediate its ends, each pin 88 has a pin and slot connection 90 with one arm of a bell crank 91 fast on a rockshaft 92. The short arm 93 of the bell crank is pivotally connected to the end of a rod 94 on a piston 95 slidable in a cylinder 96 on the column 14. When the piston is retracted to the right as shown in Fig. 12, the pin 88 is withdrawn from the holes 12 of the workpiece then in operating position. Shifting of the piston to the left as shown in Fig. 13 projects the coned end of the pin through both of the holes 12. In such movement, an arm 97 on the rockshaft 92 engages the follower 98 of a switch LS29 thereby indicating that the holes are complete and free of any obstruction. If either hole is obstructed, the pin or feeler will be blocked, and the switch LS29 will not be closed, thereby indicating an imperfection in the workpiece. In the return of the pin to its retracted position, a switch LS28 is closed.

At the milling station C, the yokes 10 of the workpiece are each milled internally to form the parallel surfaces 13. This is accomplished by a cutter 99 (Figs. 9 and 21) mounted on a suitable tool head 100 (Fig. 24) and fed through the yoke 10 by a hydraulic actuator 101, 102.

At the boring station D, the previously drilled holes 12 are finish bored by cutters 103 (Fig. 23) mounted on a common slide 104 (Fig. 14) and moved back and forth by a suitable hydraulic actuator (not shown) so as to bore first one of the holes and then the other. In order to properly position the workpiece angularly at this station, a projection 105 (Figs. 14, 15 and 23) is made rigid with one of the columns 14 and positioned thereon so as to enter between the previously milled surfaces 13 on one of the yokes 10 as the workpiece is raised into final position. The projection 105 fits snugly in the yoke, and thus holds the latter accurately against turning during operation of the boring tools.

Unloading of the machined workpieces is effected in the manner illustrated in Figs. 16, 17, and 22. A lug 130 is formed on each transfer bar at the inner end of the terminal recesses 22 therein. These lugs are high enough to remain in engagement with the ends of the workpiece being moved out of the boring station D and continue the advance of the piece along with the transfer bars 18 after the workpiece has encountered stationary inclines 131 in the final part of the transfer motion, the workpiece being forced over the top of the inclines 131 and to the position shown in Fig. 17 where it stops with the transfer bars engaging the tubular part 11 then resting on a downward incline 132. The latter holds the workpiece above the outer ends of the recesses 22 so that the transfer bars may be withdrawn from beneath the piece which is then free to roll down and off from the incline 132.

The extent of the motions produced by the various hydraulic actuators above described may be positively limited by engagement of the pistons with the ends of the respective cylinders or by the provision of stops coacting with the movable parts. All of the actuators are supplied with pressure fluid from one or more sources 106 through the circuits shown in Figs. 24 and 25 which are controlled by so-called four-way valves 107, 108, 109, 110 and 111 whose movable members are disposed in a neutral position when two associated actuating solenoids are deenergized. When one solenoid is energized, the valve member is shifted to admit pressure fluid to one end of an associated hydraulic cylinder while connecting the other cylinder end to a drain line. When the other valve solenoid is energized, the valve reverses the connections between the cylinder ends and the drain and supply lines.

Figure 24:
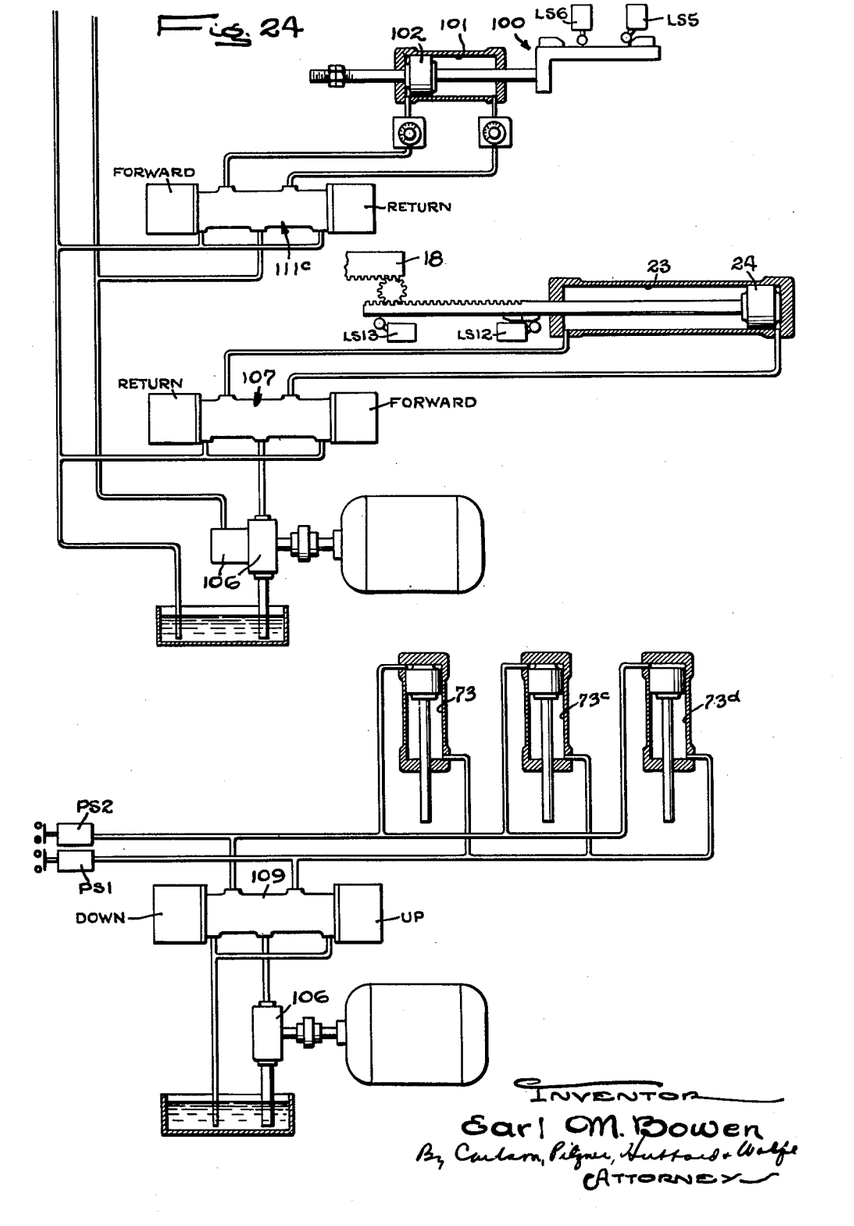
Figs. 24 and 25 when placed one above the other form a hydraulic circuit and electric switch diagram of the drilling and inspecting station part of the machine tool organization.
Figure 25:
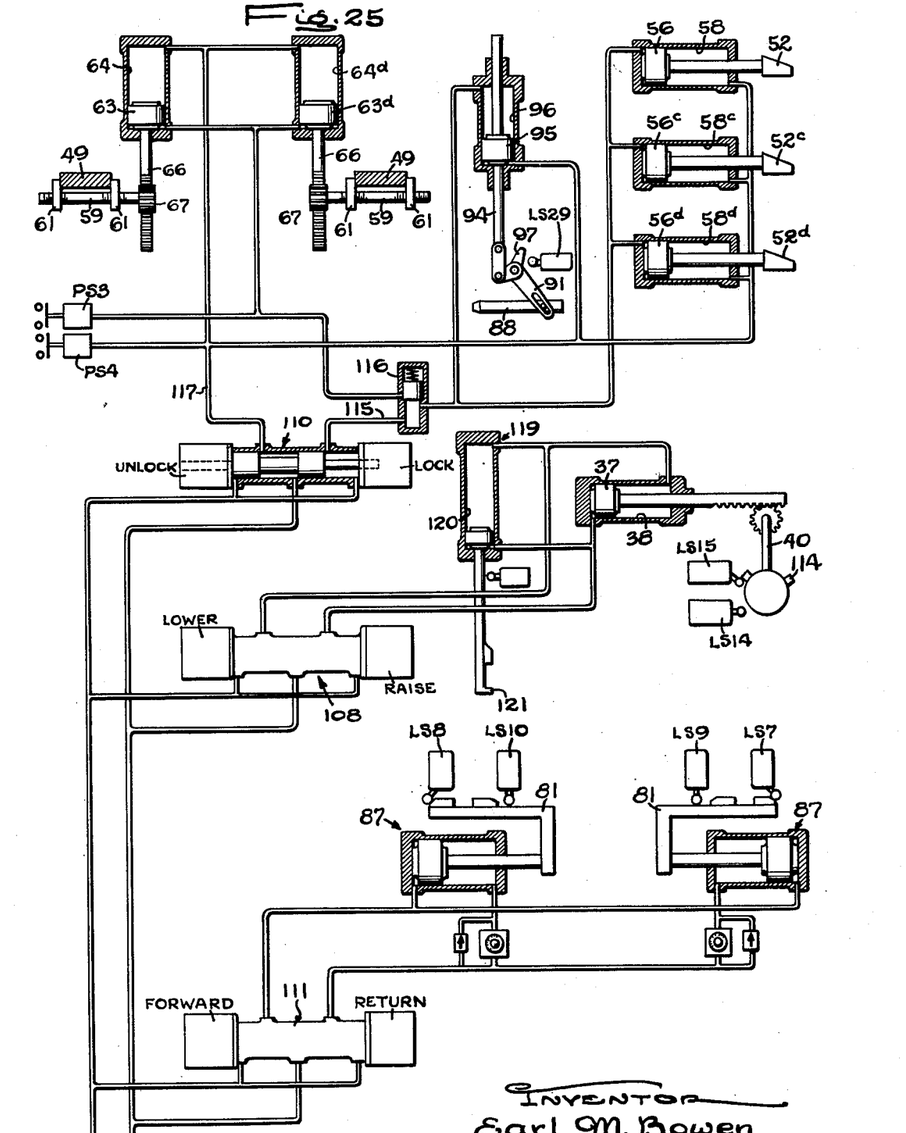

To cause the movable parts at the different stations to operate in the proper sequence and thereby execute a desired automatic cycle during which successive workpieces are advanced step by step through the successive stations and operated on at each station, the solenoid valves are arranged to be controlled by various limit and pressure switches shown in Fig. 24. These switches control the various energizing circuits through conductors which have been omitted for purposes of simplifying the disclosure and because the manner of interconnection of such switches and solenoids and the interlocking of the circuits to insure the desired sequence is well understood in the art.

Operation

Assuming that all of the various power actuated parts are in their retracted or idle positions as shown in the circuit diagram (Fig. 24), the cycle of operation proceeds as follows after all of the tool driving motors have been started and pressure fluid is available. Let it further be assumed that a series of workpieces positioned at the stations A, B, C and D have previously been operated on at these stations and are resting in the recesses 22 of the transfer bars 18 at the respective stations.

When the operator has loaded a rough workpiece into the recesses 22 on the projecting ends of the transfer bars, the cycle may be started by closing a push button switch 113 (Fig. 1). As a result, a circuit conditioned by closure of various other switches when the parts are positioned as shown is completed to energize a solenoid of the valve 107 for admitting fluid to the head end of the cylinder 23, whereby to advance the transfer bars 18. This motion is terminated in response to closure of a switch LS13 when the rough workpiece reaches the proper position in the drilling station A. Closure of the latter switch completes a circuit for energizing a solenoid of the valve 108 to admit fluid to the head end of the cylinder 38 thereby initiating upward movement of the elevator rods 28. The jaws 30 and 31 engage opposite ends of the workpiece and lift the same out of the recesses 22 in the transfer bars.

As the workpiece approaches its uppermost position, determined by the length of the cylinder 38, the yokes 10 enter in between the then retracted centering arms 68 and thereafter engage in the V-shaped sockets 48 of the blocks 49 raising the latter against their springs 50. In the final part of this motion, an arm 114 (Figs. 6 and 24) on the shaft 40 closes a switch LS14 which completes a circuit for energizing a solenoid of the valve 109 for introducing pressure fluid into the head ends of the cylinders 73 at the different stations. The resulting rotation of the shafts 79 moves the equalizing arm 68 toward each other and into engagement with the ends of the workpiece at each station. Each workpiece thus becomes centered. Thereupon, the pressure builds up in the cylinders 73 and at a proper value, closes a switch PS2 for energizing a solenoid of the valve 110 which directs pressure fluid into the head ends of the cylinders 58 for actuating the wedges 52 at the different stations. As the latter advance, the elevator rods 28 are cammed upwardly thereby raising the workpiece against the action of the spring 50 and into abutment with the stops 51 which determine the final vertical position of the workpiece ends. In this movement of the workpiece, the ends of the yokes 10 slide along the inner surfaces of the centering arms 68.

The valve 110 also directs pressure fluid into one end of the cylinder 96 to initiate projection of the feeler pin 88 at the inspecting station B into the previously drilled holes 12 of the workpiece then positioned against the V-blocks 49b at this station. If the holes are free and unblocked, the pin moves freely resulting in closure of a switch LS29 as the piston 95 completes its stroke. If, however, the workpiece is defective and prevents the pin from moving through its full stroke, the switch fails to close and prepare a circuit subsequently used in continuing the machine cycle. As a result, the entire organization is disabled until the defective workpiece has been removed.

Following completion of the strokes of the wedge actuating pistons 56 and the piston 95 at the inspecting station, the pressure of the fluid in the common supply line 115 through the valve 110 builds up and when a predetermined value is reached, a pressure responsive relief valve 116 opens to direct fluid from the line 115 to the rod ends of the cylinders 64. As a result, the pistons 63 move to turn the shafts 59 and collapse the clamps 61 against opposite sides of the blocks 49 at the stations A and D thereby positively locking the latter to hold the workpieces seated therein against lateral displacement.

Following such locking, the pressure in the line 115 builds up still further and at a predetermined value closes a pressure switch PS3 which acts in series with the then closed switch LS29 to initiate the movements of the metal cutting tools at the stations A, C and D. If by reason of detection of a broken tool or other defect in the workpiece at the inspection station so that the switch LS29 is still open, the entire machine cycle will be interrupted automatically before the drills at station A are permitted to engage the next workpiece. Also, the defective workpiece is held against further advance along the line and prevented from causing damage to the tools or other parts at the succeeding stations.

The combined closure of the switches LS29 and PS3 deenergizes the active solenoid of the valve 107 and energizes the other solenoid thereof to reverse the valve so as to direct fluid to the cylinder 23 for retracting the transfer bars 18. The operator may then load another workpiece while the remainder of the partially executed cycle is being completed.

The same switches LS29 and PS3 act conjointly to complete a circuit for energizing the solenoid 111 for admitting pressure fluid to the cylinders of the tool actuators 87 thereby initiating forward feeding of the drilling tools at the station A. Simultaneously with the energization of the valve 111 to start feeding of the drills, a valve 111c (Fig. 24) is energized to initiate feeding of the milling cutter and a similar valve (not shown) initiates the cycle of the boring head 104.

Figure 3:
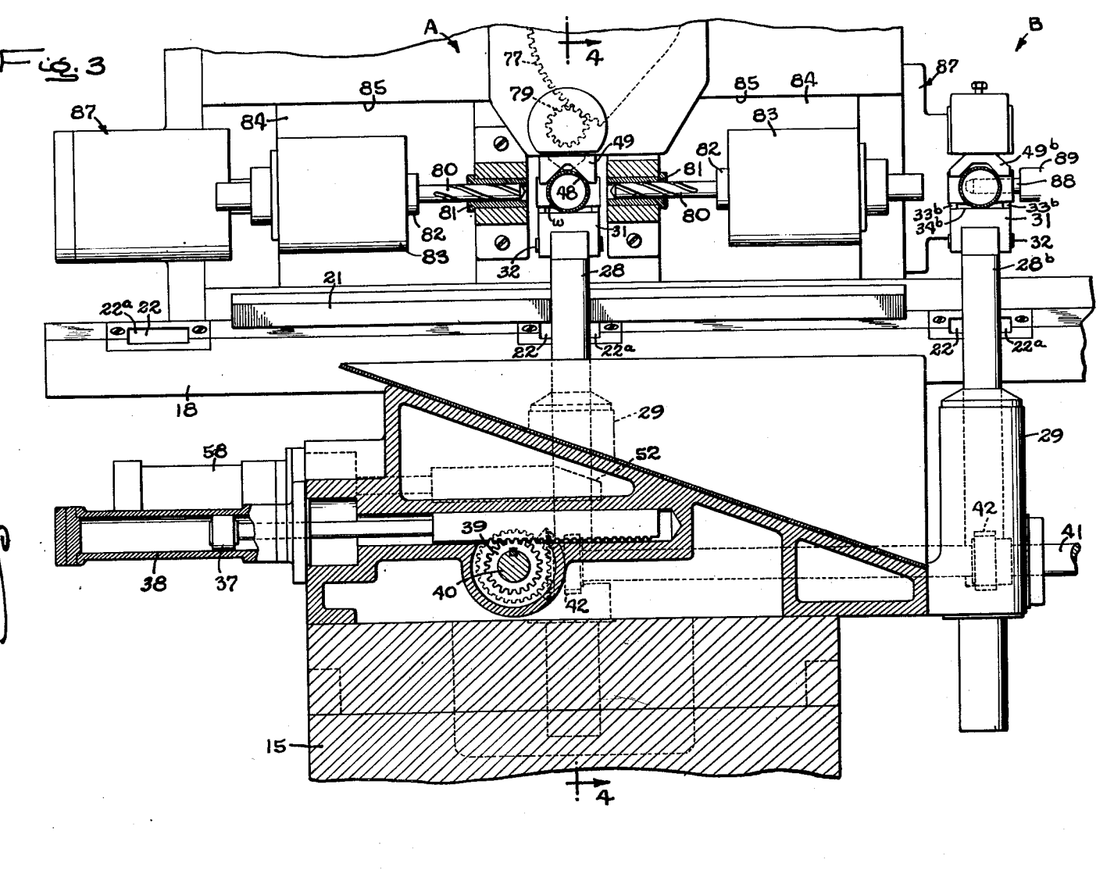
Figs. 3 and 4 are fragmentary sections taken respectively along the lines 3—3 and 4—4 of Figs. 2 and 3, respectively.
Figures 4, 5:
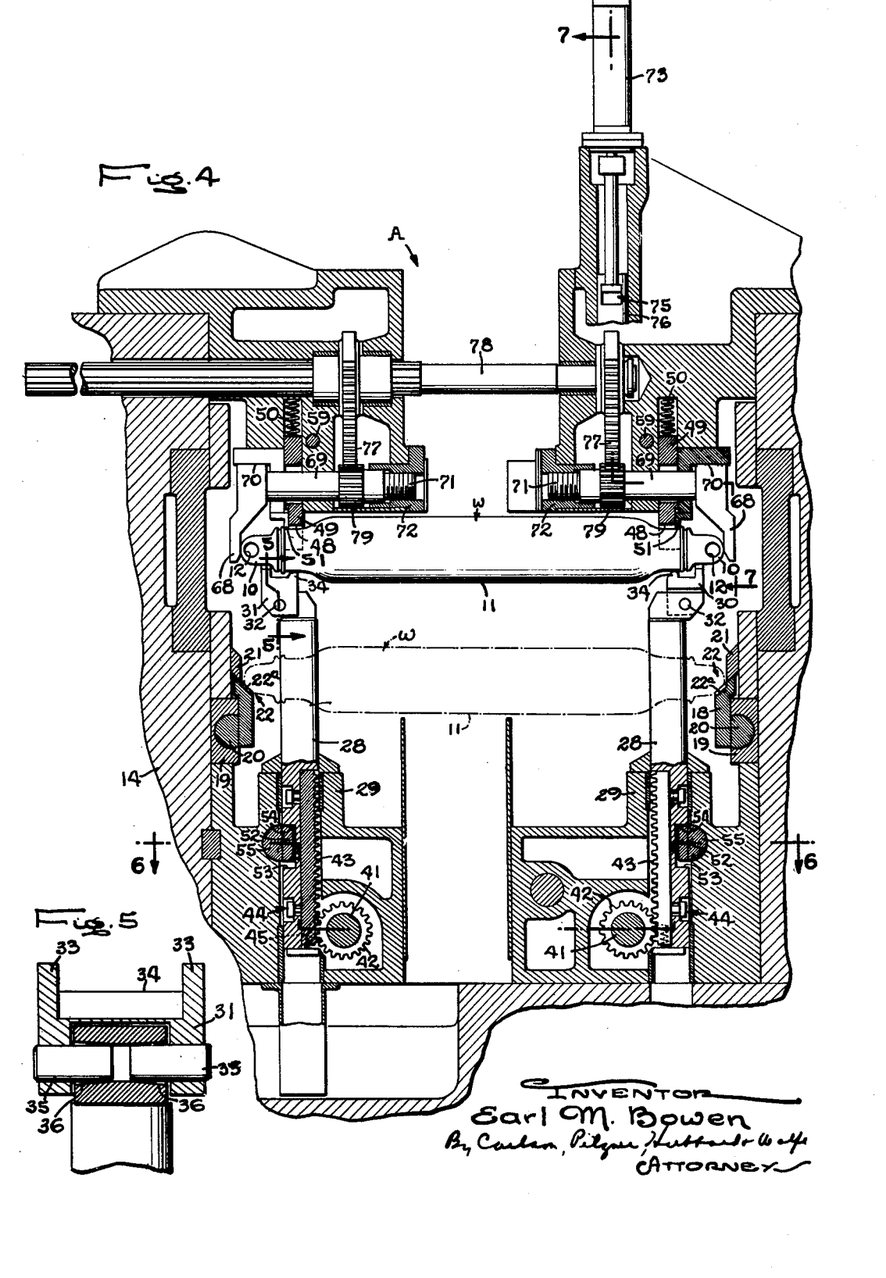
Figs. 5, 6 and 7 are fragmentary sections taken respectively along the lines 5—5, 6—6 and 7—7 of Fig. 4.
Figure 6:
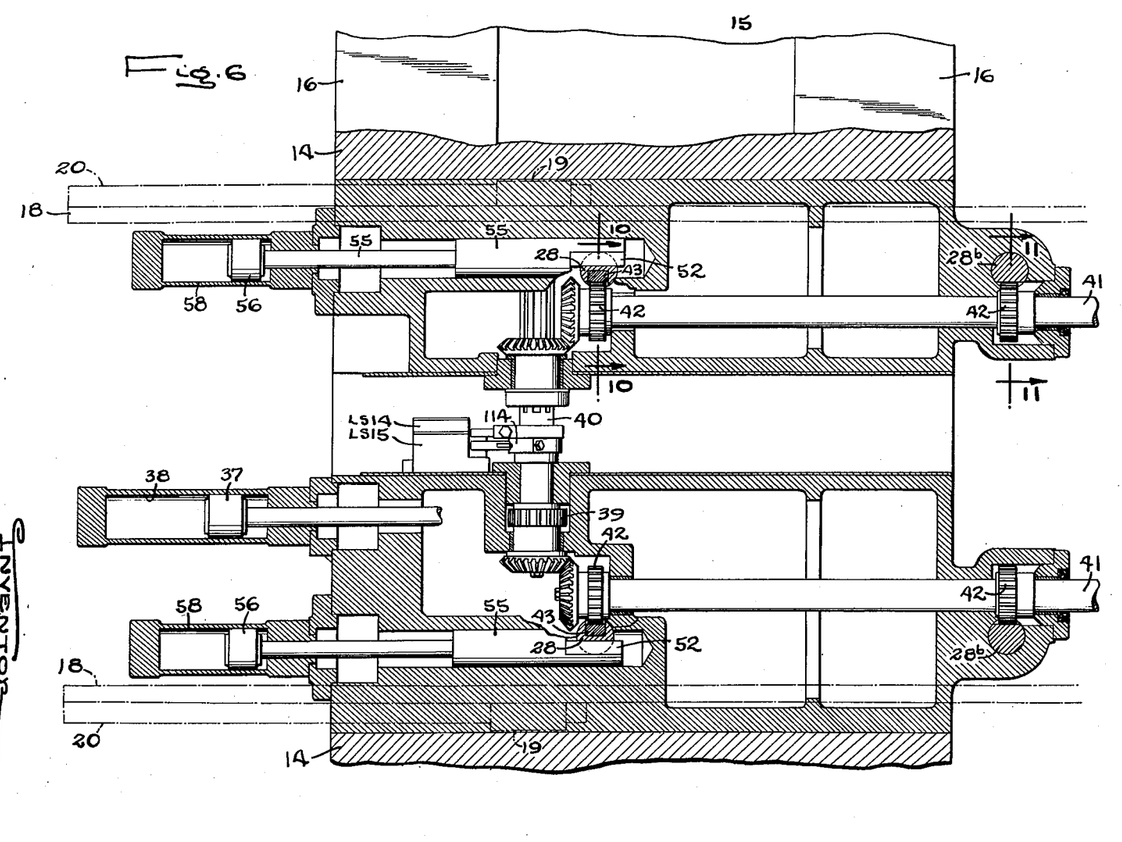

Switches LS9 and LS10 are closed when the drilling of the holes 12 has been completed thereby reversing the valve 111 to direct fluid to the actuators 87 for retracting the drills to their starting position (Fig. 3). Completion of this motion closes switches LS7 and LS8. In a similar way, a switch LS5 is closed by completion of the milling operation and retraction of the cutter 99 to starting position and a switch (not shown) is closed by completion of the boring machine cycle at station D. The combined closure of all of these tool responsive switches results in the eventual energization of the other solenoid of the completion of a circuit for deenergizing the active solenoids of the valves 109 and 110 and energizing the other solenoids thereof. Such reversal of the valve 110 directs pressure fluid to the head ends of the V-block locking cylinders 64, the rod ends of the wedge actuating cylinders 58 and the return end of the cylinder 96 at the inspecting station. As a result, the feeler pin 88 is retracted out of the workpiece at the inspecting station and the clamps and wedges at the stations A, C and D are retracted. Reversal of the valve 109 directs fluid to the rod ends of the cylinders 73 causing retraction of the centering arms 68.

With the transfer bars 18 fully retracted, a switch LS12 is closed. Then after full retraction of all of the pistons in the cylinders connected to the line 117, the pressure in the latter builds up and closes a switch PS4 at a predetermined value. Simultaneously a predetermined pressure built up in the cylinders 73 after retraction of the centering arms 68 results in closure of a switch PS1. These three switches PS1, PS4 and LS12 act together to deenergize the active solenoid and energize the other solenoid of the valve 108 thereby reversing the latter. This directs fluid into the rod end of the cylinders 38 to lower the elevator rods 28 at the different stations. Completion of this motion closes a switch LS15 which cooperates with the transfer bar actuated switch LS12 to prepare a circuit for initiation of the next cycle of the machines when the starting button 113 is again depressed by the operator after the starting circuit has been prepared by completion of the necessary motions at the separate stations.

The various work elevating, centering, locating, and clamping mechanisms at the inspecting, milling and boring stations B, C and D and the duplicated mechanisms on the other sides of the line at all of the stations operate simultaneously with the corresponding mechanisms as described above and shown in Figs. 24 and 25, the control circuits being paralleled with those already described. Various interlocks of well known character are of course provided for controlling certain of the functions in order that the latter will be executed in unison at all of the stations.

In the case of the boring operation, one additional function is performed, that is, energization of an actuator 119 (Fig. 14) for stripping the finished workpiece off from the projection 105 which enters one yoke 10 of the workpiece at this station to effect final angular positioning of the piece. This is accomplished by connecting the rod and head ends of a cylinder 120 to the head and rod ends of the elevator cylinder 38 so that a stripper 121 (Figs. 14 and 24) will be raised and lowered with the rods $28^d$. Thus, the stripper follows the rods $28^d$ downwardly and forces the workpiece off from the locater 105 if the yoke 10 engaged therewith tends to bind and stick to the latter as the rods $28^d$ are lowered.

I claim as my invention:

1. In a machine tool, the combination of, a pair of laterally spaced bars supported for horizontal reciprocation back and forth and in unison with each other, means formed on and spaced along said bars and interengageable with the opposite end portions of a series of workpieces to support the latter in uniformly spaced relation and hold the pieces against sidewise shifting relative to the bars, power actuated mechanism operable to move said bars back and forth and carry successive workpieces resting thereon into a predetermined position, abutments disposed above and facing downwardly toward said bars for engagement with a workpiece at said position, elevators engageable with the opposite end portions of the workpiece in said position and movable upwardly to carry the workpiece against said abutments, means engageable with opposite end portions of the elevated workpiece and operable during the approach thereof to said abutments to center the workpiece sidewise, separate means engageable with opposite end portions of the located workpiece and movable to center the latter endwise, and means for clamping the workpiece after location and centering thereof sidewise and endwise.

2. In a machine tool, the combination of a work supporting member engageable with a series of uniformly spaced parallel workpieces to support the latter, power actuated mechanism operable to move said member back and forth and carry successive workpieces into a predetermined position, vertically yieldable V-shaped abutments disposed above and facing downwardly toward said member for engagement with a workpiece raised from said position, fixed abutments disposed above said yieldable abutments and facing downwardly for engagement with spaced portions of a workpiece disposed against the yieldable abutments, elevators engageable with spaced portions of the workpiece in said position and movable upwardly to carry the workpiece against said yieldable abutments, means engageable with opposite end portions of the located workpiece and movable to shift the same along said yieldable abutments and center the piece endwise, means for raising said elevators further to overcome said yieldable abutments and carry the workpiece against said fixed abutments, and means for clamping said yieldable abutments against movement.

3. In a machine tool, the combination of a transfer element engageable with a series of uniformly spaced workpieces, power actuated mechanism operable to move said element to carry successive workpieces into a predetermined position, a yieldable forked abutment spaced from and facing toward said element for engagement with a workpiece shifted from said position, a fixed abutment positioned for engagement with a workpiece disposed against the yieldable abutment, a member engageable with the workpiece in said position and movable to carry the workpiece against said yieldable abutment and into the fork thereof whereby to center the workpiece in one direction, means engageable with the located workpiece and movable to shift the same along said yieldable abutment to a predetermined position and center the piece in a transverse direction, and means for further moving said members to overcome said yieldable abutment and carry the workpiece against said fixed abutment.

4. In a machine tool, the combination of a work supporting member engageable with a series of uniformly spaced parallel workpieces to support the latter from said member, power actuated mechanism operable to move said member back and forth and carry successive workpieces into a predetermined position, vertically yieldable forked abutments disposed above and facing downwardly toward said member for engagement with a workpiece raised from said position, fixed abutments disposed above said yieldable abutments and facing downwardly for engagement with spaced portions of a workpiece disposed against the yieldable abutments, elevators engageable with spaced portions of the workpiece in said position and movable upwardly to carry the workpiece first against said yieldable abutments and then further into engagement with said fixed abutments, and power actuated means for actuating said elevators after location of the workpiece against said abutments to clamp the workpiece firmly against the latter.

5. In a machine tool, the combination of a work supporting member engageable with a series of uniformly spaced parallel workpieces to support the latter, power actuated mechanism operable to move said member back and forth and carry successive workpieces into a predetermined position, fixed abutments disposed above and facing downwardly toward said member for engagement with a workpiece when the latter is raised from said position, elevators engageable with spaced portions of the workpiece in said position and movable upwardly to raise the piece to a position short of said abutments, means acting on spaced portions of the workpiece during raising thereof to locate the workpiece horizontally in one direction, elements disposed at the ends of the workpiece and movable toward each other after raising of the workpiece and location thereof in said one direction to center the latter in a transverse horizontal direction, and means for further raising said elevators to clamp the workpiece against said abutments.

EARL M. BOWEN.

References Cited in the file of this patent

UNITED STATES PATENTS

| Number | Name | Date |
|---|---|---|
| 1,794,143 | Broecker | Feb. 24, 1931 |
| 2,103,147 | Cole | Dec. 21, 1937 |
| 2,193,840 | Oberhoffken et al. | Mar. 19, 1940 |
| 2,238,921 | Waldsmith | Apr. 22, 1941 |
| 2,302,878 | Muhl et al. | Nov. 24, 1942 |